United States Patent
Mensch

(10) Patent No.: US 6,439,145 B1
(45) Date of Patent: Aug. 27, 2002

(54) CONVERTIBLE PONTOON/CAMPER/TRAILER CONSTRUCTION

(76) Inventor: Donald L. Mensch, 2721 Bauer Rd., Jenison, MI (US) 49428

( * ) Notice: Subject to any disclaimer, the term of this patent is extended or adjusted under 35 U.S.C. 154(b) by 0 days.

(21) Appl. No.: 09/757,931

(22) Filed: Jan. 10, 2001

(51) Int. Cl.[7] .............................. B63B 1/14; B63C 13/00
(52) U.S. Cl. .................. 114/61.18; 114/344; 280/414.5
(58) Field of Search ........................... 114/61.15, 61.18, 114/344; 280/414.1, 414.5

(56) References Cited

U.S. PATENT DOCUMENTS

| | | | |
|---|---|---|---|
| 2,706,642 A | * | 4/1955 | Yarnell |
| 2,759,201 A | * | 8/1956 | McKinney |
| 2,992,444 A | | 7/1961 | Schuler |
| 3,114,157 A | | 12/1963 | Stockmann |
| 3,289,225 A | | 12/1966 | Isch et al. |
| 3,300,796 A | * | 1/1967 | Powers |
| 3,329,980 A | | 7/1967 | Doty |
| 3,530,519 A | | 9/1970 | Levinson |
| 3,599,256 A | | 8/1971 | Carroll, Jr. |
| 3,629,884 A | | 12/1971 | Brown |
| 3,673,622 A | | 7/1972 | Allen |
| 3,744,070 A | | 7/1973 | Shaw |
| 3,758,897 A | | 9/1973 | Shaw |
| 3,763,511 A | | 10/1973 | Sisil |
| 3,779,574 A | | 12/1973 | Ow |
| 3,787,910 A | | 1/1974 | Talor |
| 3,792,502 A | | 2/1974 | Odegaard |
| 3,797,056 A | | 3/1974 | Brady |
| 3,860,982 A | | 1/1975 | Rumsey |
| 3,877,094 A | | 4/1975 | Kelley |
| 3,972,544 A | | 8/1976 | Soot |
| 3,978,536 A | | 9/1976 | Howe |
| 4,023,222 A | | 5/1977 | Selby |
| 4,024,592 A | | 5/1977 | Schlagenhauf |
| 4,040,134 A | | 8/1977 | Downing |
| 4,048,685 A | | 9/1977 | Gail |
| 4,354,290 A | | 10/1982 | Tevruchte et al. |
| 4,681,284 A | * | 7/1987 | Veaux et al. |
| 4,736,702 A | | 4/1988 | Gubin |
| 4,754,998 A | * | 7/1988 | LeJuerrne ................... 296/173 |
| 4,781,143 A | | 11/1988 | Logan |
| 4,909,169 A | | 3/1990 | Skandaliaris et al. |
| 4,981,100 A | | 1/1991 | Bergeron |
| 5,474,009 A | | 12/1995 | Ritchie et al. |
| 5,607,330 A | | 3/1997 | Hanz |
| 6,003,458 A | | 12/1999 | Valliere |
| 6,067,925 A | | 5/2000 | Little |

FOREIGN PATENT DOCUMENTS

FR            2 615 475      * 11/1988 .................. 114/344

* cited by examiner

Primary Examiner—Sherman Basinger
(74) Attorney, Agent, or Firm—Price Heneveld Cooper Dewitt & Litton

(57) ABSTRACT

An apparatus is convertible between a pontoon, a camper, and a trailer. The apparatus includes a main frame with longitudinally-extending beams and transverse beams. A retractable wheel frame supporting a double pair of wheels is pivoted to the main frame and is configured to swingingly retract into a center area of the main frame. Side, front and rear pontoons are attached to the main frame, with the side pontoons being extendable laterally to provide increased width to the apparatus. A vertical upright beam is slidably attached to the main frame, and includes a bottom hitch and a top boom, both of which are moved by an actuator attached to the upright beam.

34 Claims, 6 Drawing Sheets

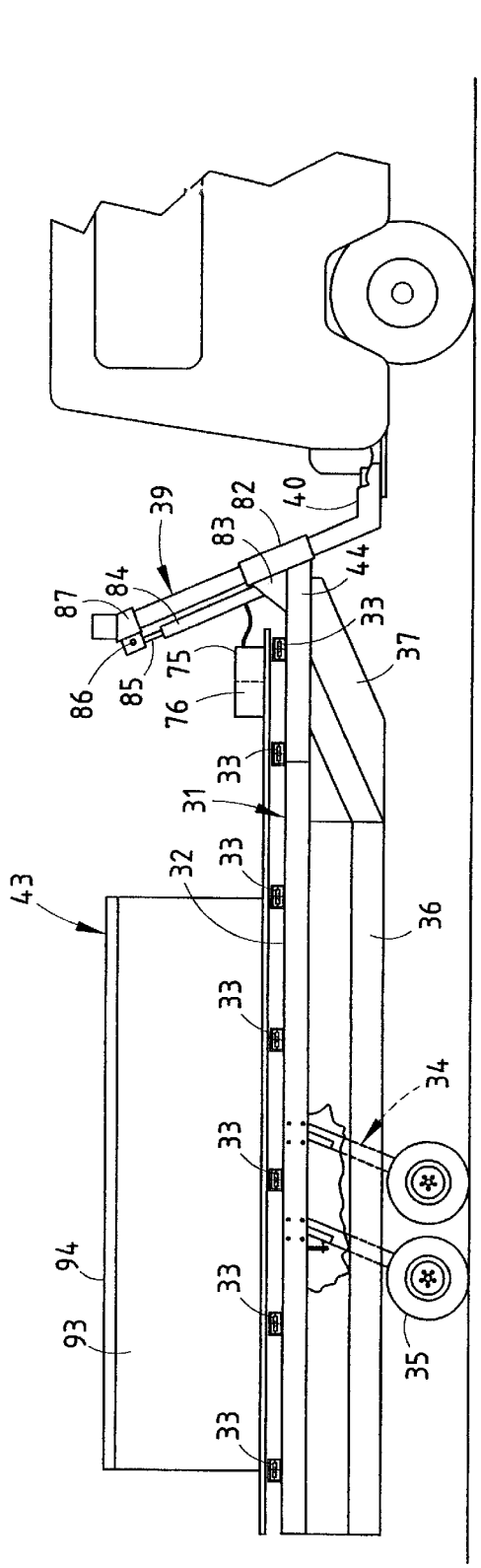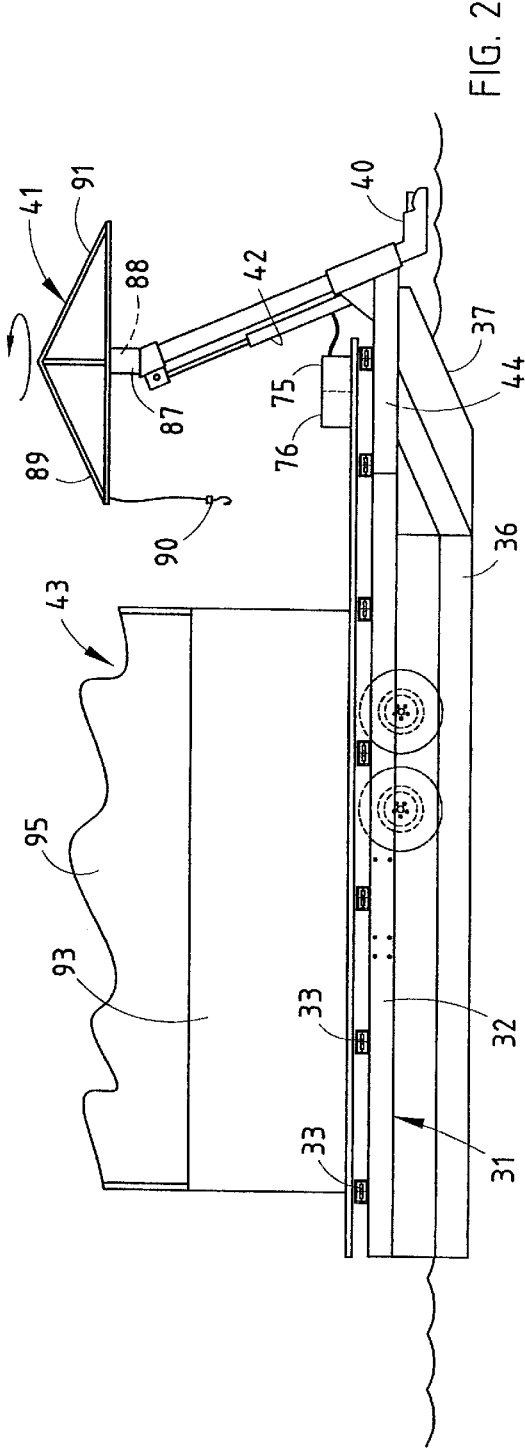

US 6,439,145 B1

CONVERTIBLE PONTOON/CAMPER/ TRAILER CONSTRUCTION

BACKGROUND OF INVENTION

The present invention relates to an apparatus that is convertible between a pontoon boat, a camper, and a trailer construction. The invention includes aspects relating to a retractable wheel construction, an expandable frame construction, and a retractable hitch/boom construction, but is not limited to only these individual aspects.

It is known to provide a single apparatus convertible between a trailering arrangement and a pontoon arrangement. However, improvements are desired for compact storage of wheels when pontooning, yet stable support when trailering. Specifically, the wheel arrangement needs to provide for optimal stability and safety when trailering. At the same time, the wheel arrangement must be retractable preferably for very compact storage so that it does not reduce pontoon speed or become corroded due to contact with water. The wheel arrangement should also preferably be made so that it cannot be accidentally retracted when trailering. Also the wheel arrangement must be low cost yet high strength, especially for large boat/camper constructions having a length of 30 or more feet. Also, it is desirable to improve the pontoon arrangement for stable flotation even while moving fast enough in the water to plane on the water. Still further, the pontoon deck arrangement should be reliably expandable and contractible despite the wet environment. Specifically, the structure providing the expandability should preferably provide for easy reliable expansion yet be mechanically non-complex and durable.

It also desirable to provide an improved hitch arrangement that positions the hitch preferably out of the water when pontooning, yet that facilitates attachment to a vehicle. At the same time, a mechanical simple boom is desired that can assist in lifting boating onto the deck of the craft, such as a ski boat or the like.

Accordingly, an apparatus solving the aforementioned problems and having the aforementioned advantages is desired.

SUMMARY OF THE INVENTION

In one aspect of the present invention, an apparatus includes a main frame with opposing sides, a front, a rear, and a center area. The main frame includes longitudinally-extending beams on right and left sides of the center area, and further includes transverse beams supported by the longitudinally-extending beams. A retractable wheel frame includes wheels, axles, and subframe members, the subframe members supporting the axles and being vertically movably connected to the main frame. Pontoons are operably supported on the opposing sides by the transverse beams for movement between an outwardly-expanded position where the center area is open for receiving the wheel frame, and an inwardly-contracted position where the center area is not sufficiently open to receive the wheel frame.

In another aspect of the present invention, an apparatus includes a main frame with opposing sides, a front, a rear, and a center area. The main frame includes longitudinally-extending beams on right and left sides of the center area, and transverse beams supported by the longitudinally-extending beams. A retractable wheel frame includes wheels, axles, and subframe members, the subframe members supporting the axles and being vertically movably connected to the main frame. Side pontoons are provided that are supported on the opposing sides by the transverse beams. Front and rear pontoons are provided that are supported on the front and rear, respectively. The side pontoons and the front and rear pontoons are positioned to define a cavity under the center area for receiving the wheel frame and wheels. At least one of the front and rear pontoons provides storage space.

In another aspect of the present invention, an apparatus includes a main frame with opposing sides, a front, a rear, and a center area. The main frame includes longitudinally-extending beams on right and left sides of the center area, and transverse beams supported by the longitudinally-extending beams. The longitudinally-extending beams and the transverse beams form an enlarged deck area. A wheel frame includes a pair of front wheels, front axles, and a front subframe pivoted to the main frame. The wheel frame further includes a pair of rear wheels, rear axles, and a rear subframe pivoted to the main frame. The wheel frame still further includes interconnecting braces that connect the front and rear subframes to cause simultaneous swinging movement of the front and rear subframes between an extended position where the wheel frame extends downwardly to contact the front or rear wheels with a ground surface, and a retracted position where the wheel frame is received partially into the main frame in the center area. An actuator is operably connected to the main frame and the wheel frame for moving the wheel frame between the extended and retracted positions.

In still another aspect of the present invention, an apparatus includes a main frame with opposing sides, a front, a rear, and a center area, the main frame including a plurality of beams. A retractable wheel system includes wheels movable between an extended position for contacting a ground surface and a retracted position. The apparatus further includes a hitch system having a vertically-extending upright beam with a hitch at a lower end thereof. The upright beam is slidably connected to the main frame and movable between a lowered position where the hitch is positioned at a height for engaging a vehicle's hitch when the wheels are in the extended position, and a raised position where the hitch is held in safe storage. An actuator is provided for moving the upright beam between the raised and lowered positions. A boom is attached to a top of the upright beam and is movable by operation of the actuator.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a side view of the present pontoon/camper/trailer apparatus, the apparatus being shown in a trailering arrangement;

FIG. 2 is a side view of the apparatus shown in FIG. 1, with the apparatus being shown in a pontoon arrangement;

DETAILED DESCRIPTION OF PREFERRED EMBODIMENT

Figure 3:
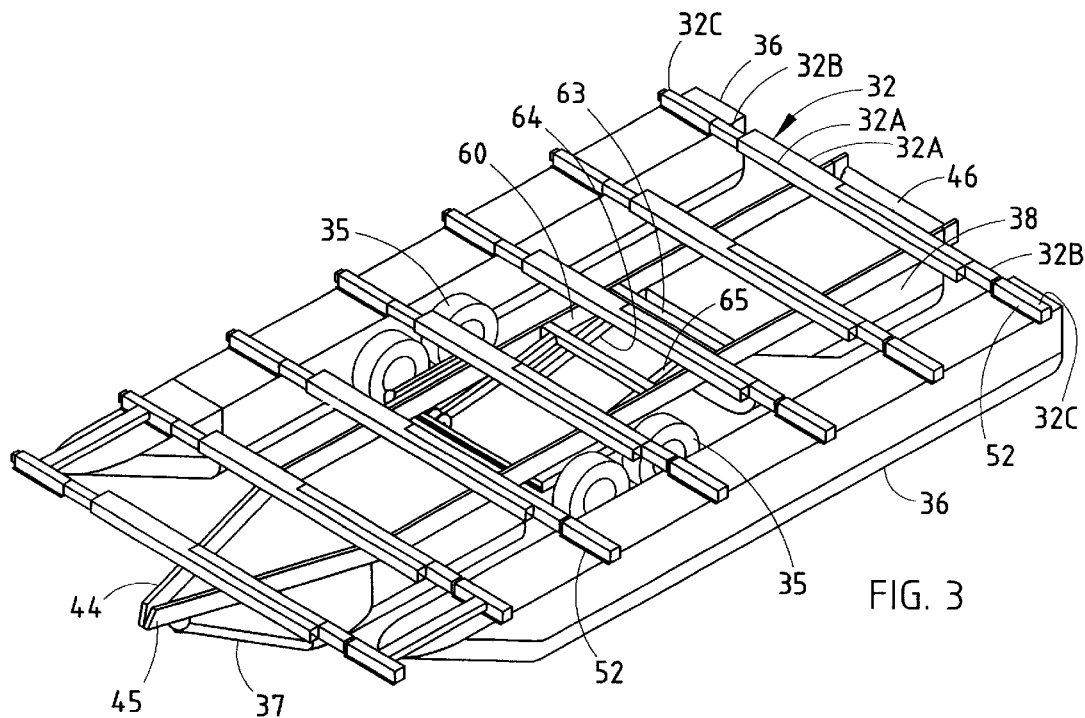
FIG. 3 is a top perspective view of the apparatus shown in FIG. 1, the decking and cabin being removed to show the main frame, pontoons, and wheel frame of the present apparatus.
Figure 4:
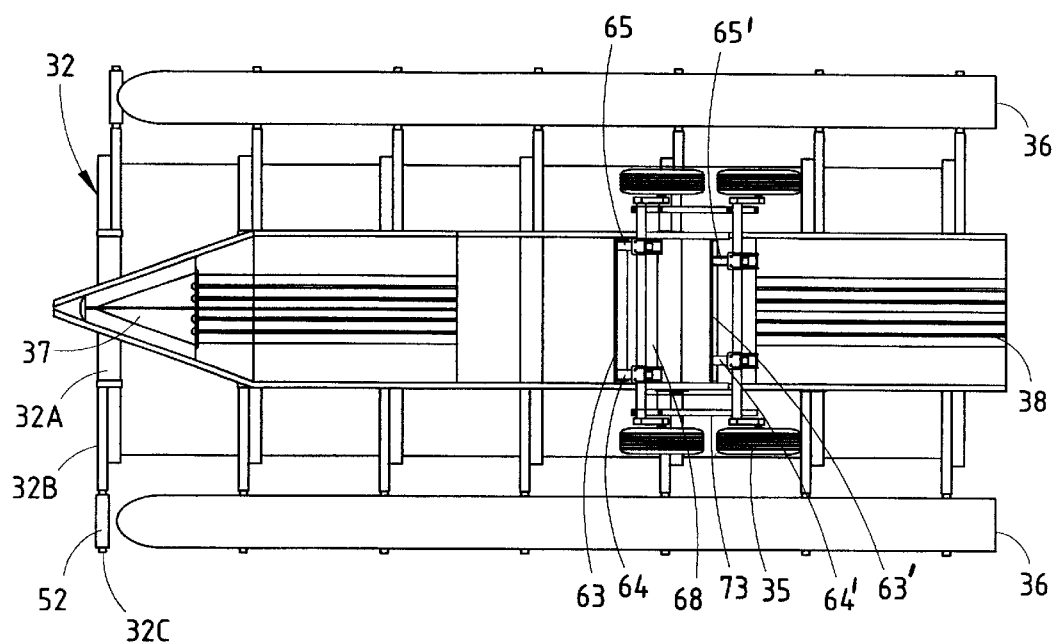
FIG. 4 is a top view of FIG. 3.

An apparatus 30 embodying the present invention is convertible between a trailer arrangement (FIG. 1), a pontoon (FIG. 2), and a camper (similar to FIG. 2 but with wheels still extended and hitch lowered). The apparatus 30 includes a main frame 31 (FIG. 3) with longitudinally-extending parallel beams 32 and a plurality of parallel transverse beams 33. A retractable wheel frame-34 supporting wheels 35 is pivoted to the main frame 31 and is configured to swingingly retract into a center area of the main frame 31 (FIG. 2) for pontooning but also swingingly extend for trailering (FIG. 1). Side, front and rear pontoons 36, 37 and 38 (FIG. 3) are attached to the main frame 31, with the side pontoons 36 being extendable laterally to provide increased width to the apparatus 30 when pontooning or using the apparatus for camping. A vertical upright beam 39 is slidably attached to a front of the main frame 31, and includes a bottom hitch 40 and a top boom 41, both of which are moved by a cylinder actuator 42.attached to the upright beam 39. By this arrangement, a compact and stable construction is created for trailering, yet which is expandable and convertible for pontooning or camping in an efficient manner.

The main frame 31 (FIG. 3) includes angled front beams, 44 and 45 attached to a front end of longitudinally-extending beams 32 to form a V-front, and further includes a transit beam 46 connected to the rear ends of the longitudinally-extending beams 32 for forming a boat motor mount. The transverse beams 33 include pairs of outer beams 32A that each telescopingly support an intermediate beam 32B which, in turn, telescopingly supports an inner beam 32C. The beams 32A–32C are square in cross section for maximum stability, but it is noted that other cross sections can be used. It is also noted that more or less transverse beams can be used depending on a length of the main frame 31 and upon the load per square foot that is expected of the trailering apparatus 30. It is contemplated that the main frame 31 will be constructed primarily of aluminum square (or rectangular) tubing for high strength yet light weight.

Figure 5:
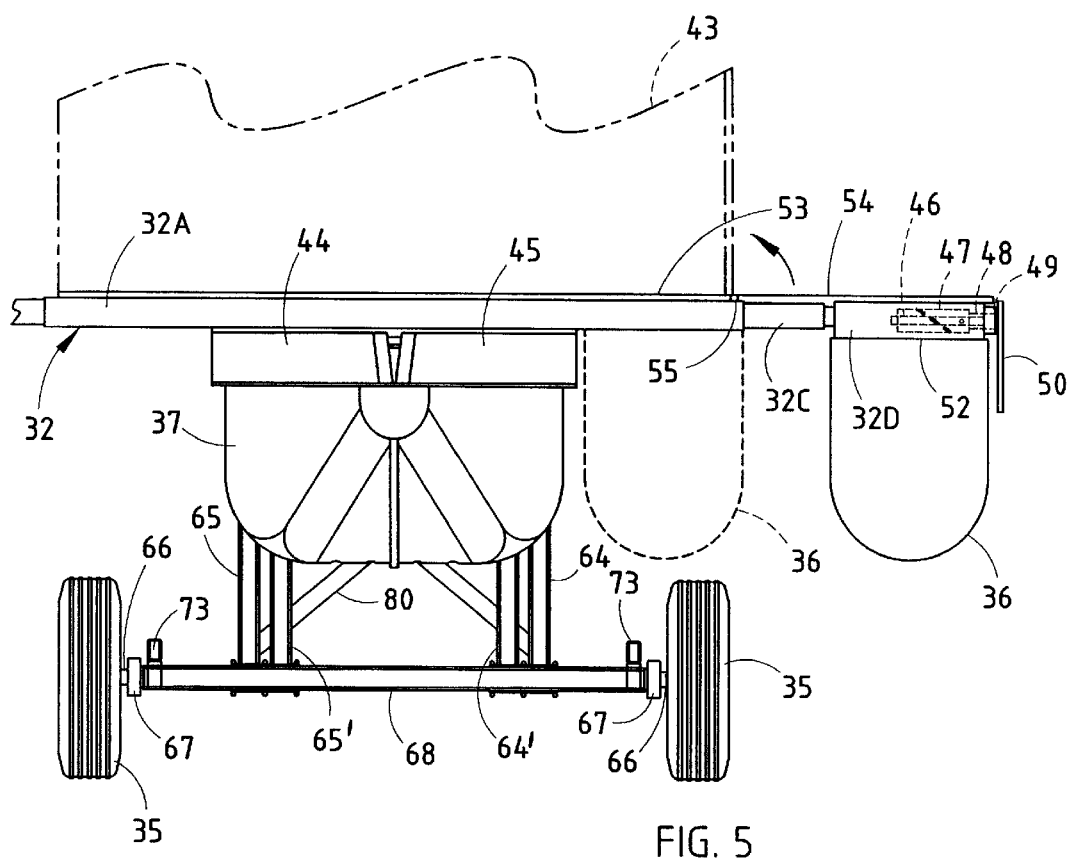
FIG. 5 is a fragmentary front view of FIG. 1.

A pair of wedging members 46 and 47 (FIG. 5) are positioned within the inner tube 32C and a threaded member.48 extends through the wedges 46 and 47 for adjustable wedging engagement within the inner tube 32C. The threaded member 48 includes a head 49 that extends outwardly and a side fascia 50 is attached to the head 49. A bottom outer end of the tubes 32A and 32B are open.

Figure 7:
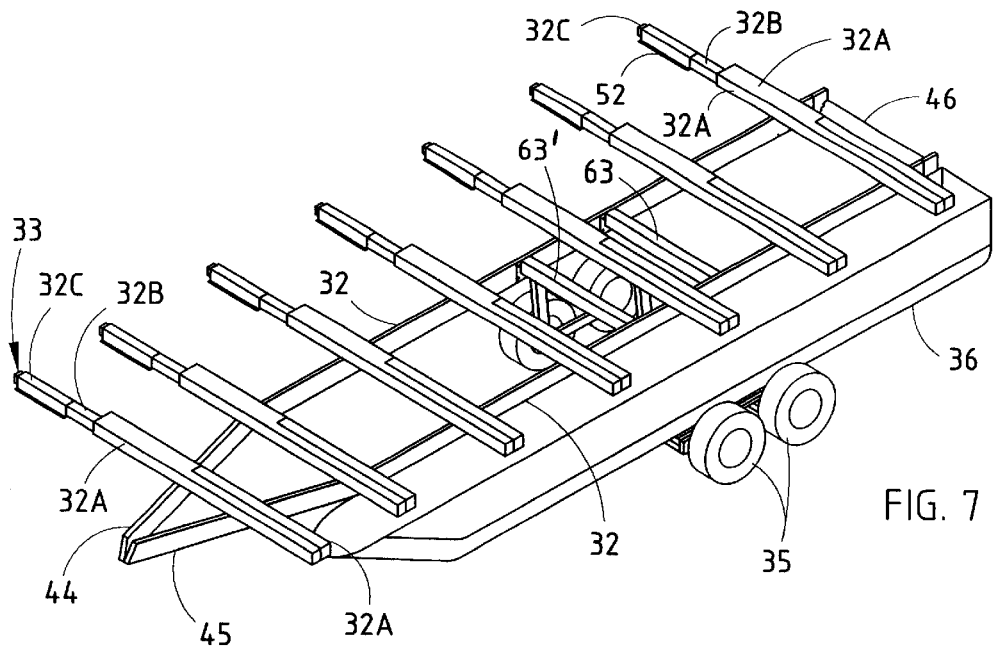
FIG. 7 is a perspective view similar to FIG. 3, but with the center and right pontoons removed to better show the wheel frame, and with the wheel frame in the trailering position.
Figure 9:
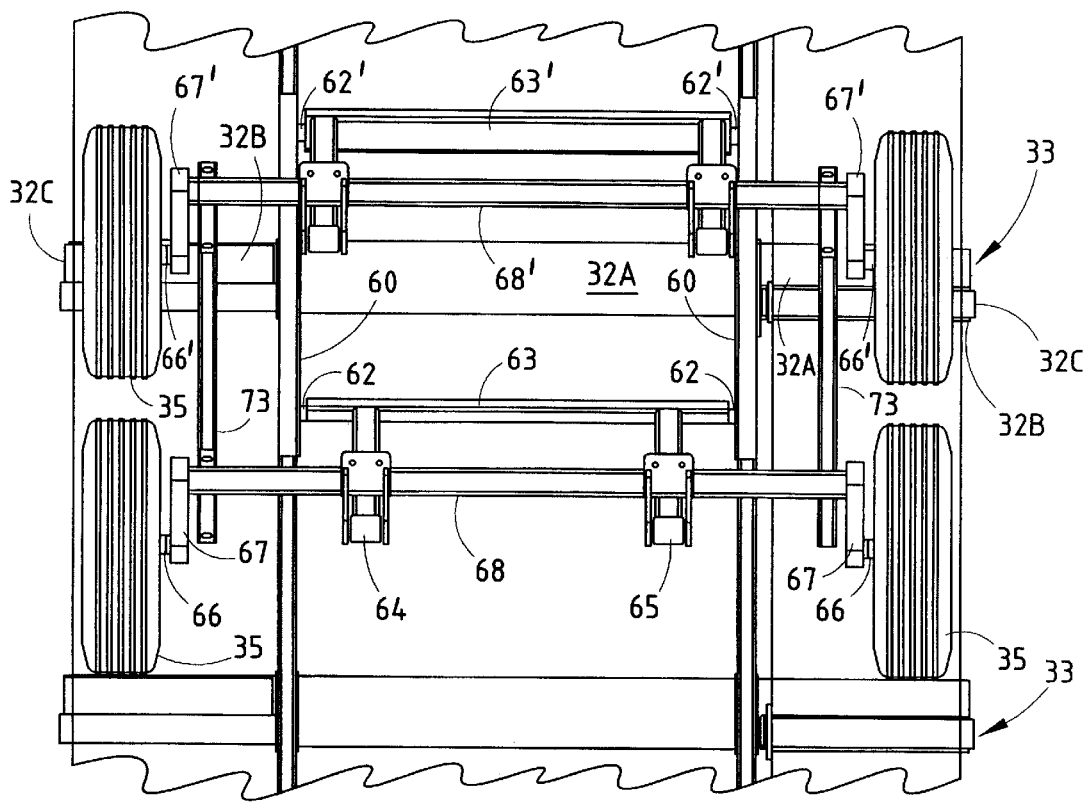
FIG. 9 is a bottom fragmentary view of the apparatus of FIG. 8.

A pontoon-supporting bracket 52 (FIGS. 3, 5, and 7) is attached to the bottom of outer tube 32C and to a top of the side pontoons 36. The open bottoms of tubes 32A and 32B allow the bracket 52 to be telescoped inwardly under the ends of tubes 32A and 32B. This allows a tighter collapsed position of the side pontoons 36 while maintaining a strength and stability of the telescoping tube structure. The triple tube 32A, 32B and 32C provides a more stable support for the expanded deck structure 53. The deck structure 53 is made from panel-like sheeting positioned on the transverse beams 33. The side portions 54 of the decking structure 53 is made collapsible so that the transverse beams 33 can be covered when extended and also the side decking can be collapsed when the tubes 32B and 32C are collapsed. For example, decking 53 is supported on tubes 32A, but the outer side decking 54 is supported on extended tubes 32B and 32C when they are extended. When the tubes 32B and 32C are retracted in the illustrated arrangement, the side decking 54 is pivoted about hinge 55 to position them adjacent a sidewall of the cabin 43.

It is contemplated that the tubes 32B and 32C can be retracted and extended by various means. For example, a cable system (not specifically shown) can be attached to each of these members inside (or outside) of the transverse beams 33 and routed to a single (or multiple) actuator (such as a winch) for operation. Alternatively, a rigid beam can be attached to the ends of each of the beams 32C and hydraulic actuators can be used. Still further, it is contemplated that gears, threaded devices, and electrical or mechanical actuators can be used.

The shape and construction of pontoons 36-38 do not need to be described for an understanding of the present invention. It is sufficient to note that various pontoon shapes and sizes can be designed as desired to provide different riding comfort and speeds. In the present pontoons 36–37, an angled front surface is used on all four pontoons to provide better planing on water when the boat is moving at a rapid pace. It is noted that various longitudinally-extending grooves and ribs (see FIG. 5) are used along a bottom and side of the present pontoons for improved stability and tracking in the water. It is also noted that the pontoons can include square, flat or rounded bottom surfaces, and further that the side pontoons can be located at an optimal height relative to the center pontoon for improved stability of the present apparatus 30 when in the water. In the present case, it is noted that the pontoons 37 and 38 and also the side pontoons 36 provide a large amount of storage space that is well-distributed around the main frame 31 for good trailering and pontooning. In particular, the center front and rear pontoons 37 and 38 provide a significant amount of accessible storage area. It is noted that the decking 53 can include removable hatches or doors for access to the interior space of these pontoons. It is contemplated that various known means can be used to prevent water from entering the pontoons and/or for removing water from inside the pontoons, such as sump pumps, baffles, and the like.

A bracket 60 is attached to an inside of the longitudinal beams 32 and includes inwardly extending pivot pins 61 and 62. Where the longitudinally-extending beams are aluminum for light weight, and where the wheel frame 34 is steel, a gasket or spacer must be used to separate the two dissimilar metals to prevent corrosion. The wheel frame 34 includes a tubular cross beam 63 with a bearing at each end that pivotally engages the respective pivot pins 61, and further includes a pair of downwardly-extending side frame members 64 and 65 fixedly attached to the cross beam 63 near pivots 61, and still further includes a lower tubular cross beam 68 pivotally attached to a bottom of the side frame members 64 and 65. An axle 66 supports each of the wheels 35, and the axle 66 is in turn supported by a torsion arm 67 and an internal torsion spring device 69 on the lower cross beam 68. The lower ends of beams 64 and 65 are pivotally connected to a forward side of the cross beam 68 by an attachment bracketry arrangement 69A. This arrangement positions the beams 64 and 65 at a better location when the wheel frame 34 is retracted to a storage position, such that the cross beam 68 fits more compactly into and nests better inside of a center area of the main frame 31. (See FIG. 3)

Figure 8:
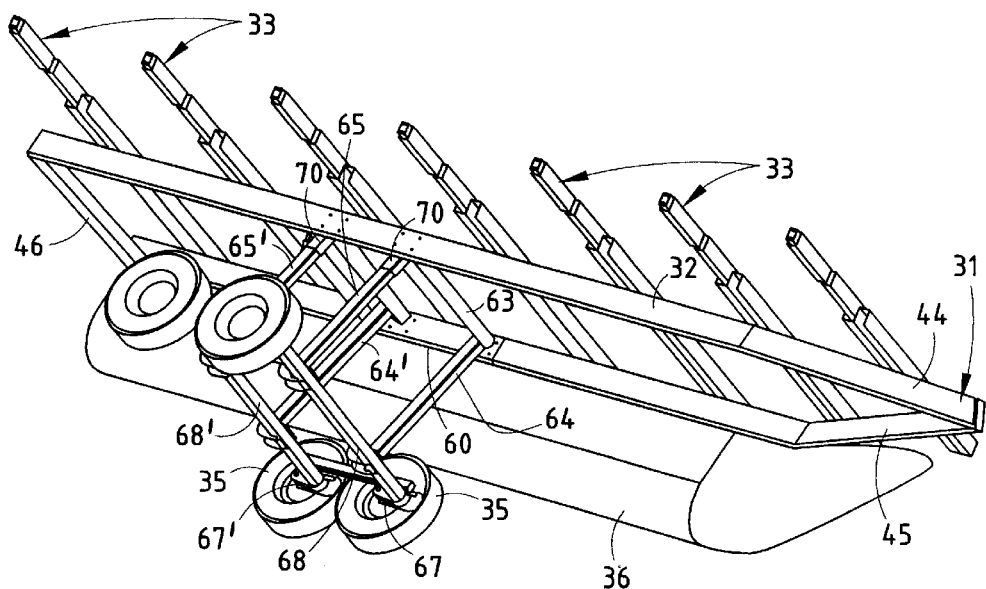
FIG. 8 is a bottom perspective view of the apparatus shown in FIG. 7.
Figure 8A:
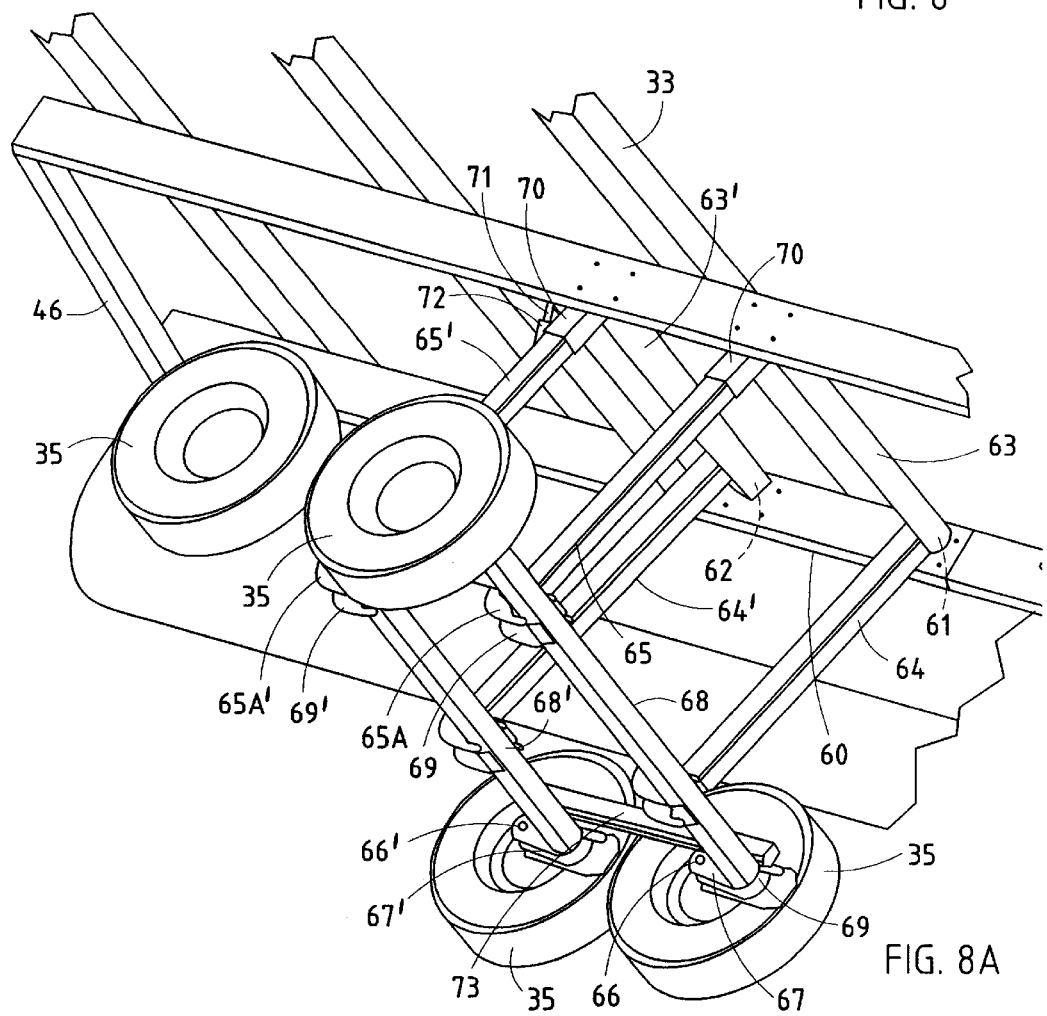
FIG. 8A includes an enlarged fragmentary perspective view of the wheel frame assembly shown in FIG. 8.
Figure 10:
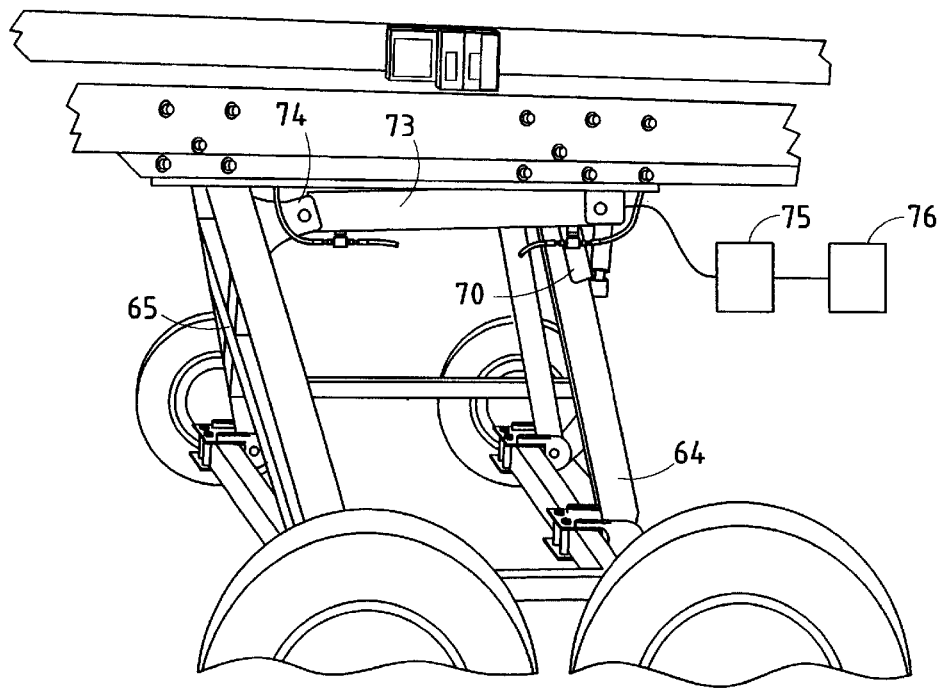
FIG. 10 is a fragmentary perspective view of the wheel frame in the trailering position.
Figure 11:
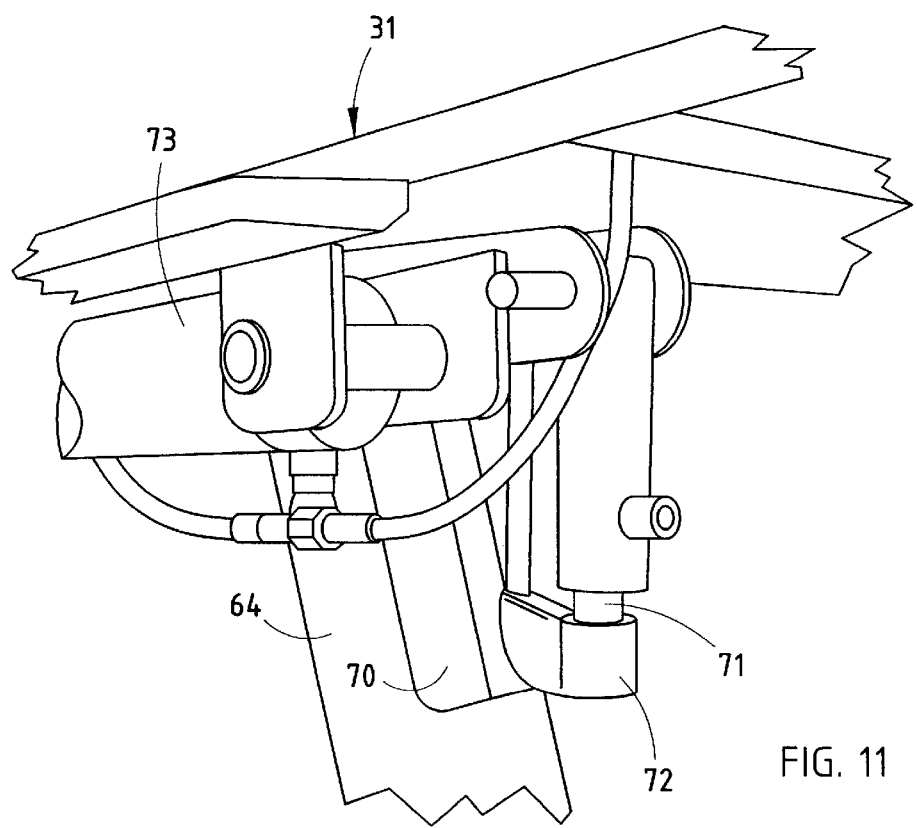
FIG. 11 is a side view of the interlock pin for retaining the wheel frame in the trailering position.

U-shaped guide brackets 70 (FIGS. 8A, 10, and 11) are attached to the longitudinal beams 32 to receive the beams 64 and 65 when the wheel frame 34 is moved to the extended ground engaging position as shown in FIG. 8A. The brackets 70 include side flanges that engage sides of the beams 64 to stabilize the wheel frame 34 when in the retracted/stored position for improved trailering.

An extendable pin 71 is attached to the longitudinally-extending beam(s) 32 and a pocket bracket 72 is attached to the down beams 64. When the wheel frame 34 is extended, the pin 71 is extendable to engage the pocket bracket 72 to secure the wheel frame 34 in the ground engaging extended position. A hydraulic cylinder 73 with extendable rod 74 (FIG. 10) is operably connected between the main frame 31 and the wheel frame 34. The cylinder 73 is connected to a pump actuating mechanism 75, such as a hydraulic pump. The fluid motivating member of pump 75 is further connected to the generator 76 on the main frame 31 (see FIG. 1). The members 63–65 form a rigid and stable front subframe. A similar second (rear) subframe is shown by members 63'–65', and it includes members 66'–69' similar to members 66–69 discussed above. The front and rear subframes are interconnected by fore/aft frame members 79 for simultaneous pivoting. Specifically, the frame members 79 rigidly interconnect the front cross beam 68 and rear cross beam 68'. It is contemplated that the present invention includes more or less wheels as needed for the particular apparatus being constructed.

Figure 6:
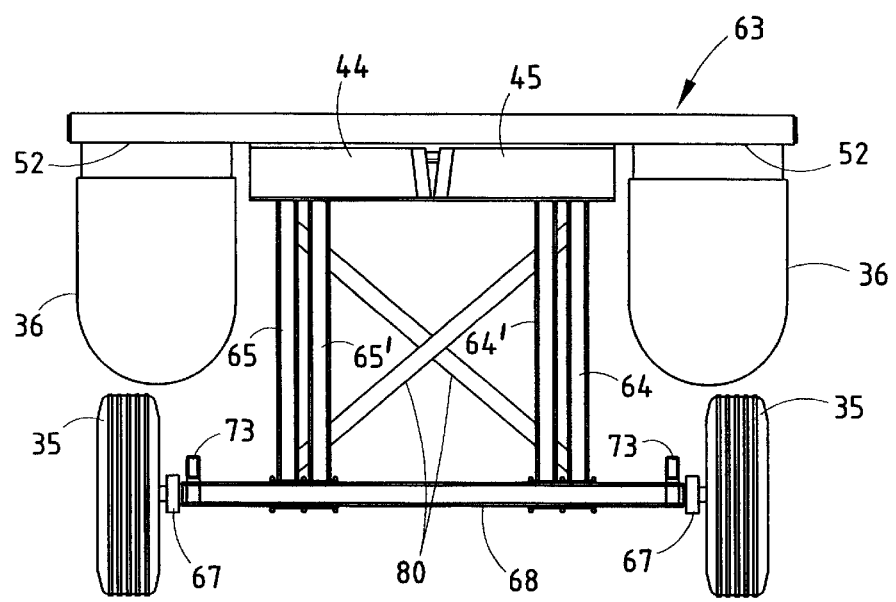
FIG. 6 is a front view similar to FIG. 5, but with both side pontoons retracted for trailering and with the center pontoons removed to better show the wheel frame.

When collapsed (FIG. 3) the rear subframe fits within the front subframe, which in turn, fits within and partially between the longitudinally-extending beams 32 under the center area of the main frame 31. Where additional stability of the front and/or rear subframes is desired, X-type cross-bracing 80 (FIG. 6) can be used. In the illustrated embodiment, the cross-bracing 80 are square tubular members that are somewhat smaller in cross section than the frame members 63–69. The cross-bracing 80 is welded near a lower side of the tubes 64–65 when the wheel frame 34 is in the retracted storage position. This allows better nesting which results in a closer, more compact storage. At the same time, the cross-bracing prevents the subframes from being moved upwardly to an overcenter condition where the cylinder 73 cannot operate to extend the wheel frame 34.

A square tube section 82 is welded to a front of the angled beams 44 and 45 on the main frame 31. Bracing 83 stiffens the tube 82 and rigidities it on the main frame 31. The upright beam 39 has square cross section and extends slidably through the tube section 82. It is supported by linear bearings as needed. The actuator 42 includes a cylinder 84 pivotally connected to the bracing 83 and further includes an extendable rod 85 pivotally connected by bracket 86 to a top end 87 of the upright beam 39. The cylinder 84 is operably connected to the hydraulic device 75 for retraction (FIG. 1) and extension (FIG. 2). By operating the actuator 42, the hitch 40 can be moved between a lowered position for trailering (FIG. 1)(or for camping) and a raised position for pontooning (FIG. 2) where the hitch 40 is located out of the water. Further, it is contemplated that the hitch can be covered such as by a waterproof bag or the like. It is contemplated that boom 41 can be provided which includes a lower rod 88 that pivotally engages the upper end 87 of the upright beam 39. The boom further includes a front portion 89 having a hook or grabbing mechanism on one end and a rearwardly protruding section 91 that can include a means for attaching a counterweight to offset the weight of the device being lifted. By this arrangement, the hydraulic cylinder 42 can be used to raise and lower the boom 41. For example, this can be used to load a powered water ski/boat or other device onto a front of the apparatus 30 and/or to unload the same.

It is contemplated that various cabin arrangements can be provided. The illustrated cabin 43 includes rigid box-like sidewalls 93 and an extendable "pop" top 94 with tent-like sidewalls 95 or screening therebetween. It is contemplated that various amenities such as a refrigerator, an oven, lights, a winch, furniture, bedding, and the like can be provided within or around the cabin 43.

In the foregoing description, those skilled in the art will readily appreciate that modifications may be made to the invention without departing from the concepts disclosed herein. Such modifications are to be considered as included in the following claims, unless these claims by their language expressly state otherwise.

The invention claimed includes:

1. An apparatus comprising:
 a main frame with opposing sides, a front, a rear, and a center area, the main frame including longitudinally-extending beams on right and left sides of the center area and transverse beams supported by the longitudinally-extending beams;
 a retractable wheel frame including wheels, axles, and subframe members, the subframe members supporting the axles and being vertically movably connected to the main frame; and
 pontoons operably supported on the opposing sides by the transverse beams for movement between an outwardly-expanded position where the center area is open for receiving the wheel frame, and an inwardly-contracted position where the center area is not sufficiently open to receive the wheel frame.

2. The apparatus defined in claim 1, wherein the retractable wheel frame includes a pair of front wheels, a pair of front axles rotatably supporting the front wheels, a front subframe pivoted to the main frame and rotatably supporting the front axles in a torsion axle arrangement.

3. The apparatus defined in claim 1, wherein the wheel frame includes a pair of front wheels, front axles, and a front subframe pivoted to the main frame, and further includes a pair of rear wheels, rear axles, and a rear subframe pivoted to the main frame, and still further includes interconnecting braces that connect the front subframes to cause simultaneous swinging movement of the front and rear subframes between an extended position where the wheel frame extends downwardly to contact the front and rear wheels with a ground surface, and a retracted position where the wheel frame is received partially into the main frame in the center area.

4. The apparatus defined in claim 1, including a locking pin attached to one of the main frame and the retractable wheel frame for interlockingly engaging the other of the main frame and the retractable wheel frame for holding the retractable wheel frame in a lowered position for contacting a ground surface.

5. The apparatus defined in claim 1, wherein the wheel frame is pivotally connected to the main frame at a main pivot, and further moves overcenter when moving between a ground contacting lowered position and a retracted raised position.

6. The apparatus defined in claim 1, including an actuator attached between the main frame and the wheel frame for lifting the wheel frame automatically.

7. The apparatus defined in claim 1, wherein the transverse beams each include a first tube attached to the longitudinally-extending beams and a second tube that telescopes in the first tube for providing a laterally adjustable width support on the main frame.

8. The apparatus defined in claim 7, wherein the transverse beams include a third tube telescopingly adjustably engaging in the second tube.

9. The apparatus defined in claim 1, wherein the pontoons include side pontoons operably supported on the opposing sides and further include at least one center pontoon fixed to the main frame.

10. The apparatus defined in claim 9, wherein the at least one center pontoon includes a front center pontoon and a rear center pontoon that leave an open space in the center area.

11. The apparatus defined in claim 1, including a retractable hitch attached to the front of the main frame.

12. The apparatus defined in claim 11, wherein the retractable hitch includes an upright beam that is slidably attached to the main frame and further includes a boom attached to a top of the upright beam.

13. An apparatus comprising:
a main frame with opposing sides, a front, a rear, and a center area, the main frame including longitudinally-extending beams on right and left sides of the center area and transverse beams supported by the longitudinally-extending beams;
a retractable wheel frame including wheels, axles, and subframe members, the subframe members supporting the axles and being vertically movably connected to the main frame; and
side pontoons supported on the opposing sides by the transverse beams and front and rear pontoons supported on the front and rear, respectively, the side pontoons and the front and rear pontoons being positioned to define a cavity under the center area for receiving the wheel frame and wheels, at least one of the front and rear pontoons providing storage space.

14. The apparatus defined in claim 13, wherein the retractable wheel frame includes a pair of front wheels, a pair of front axles rotatably supporting the front wheels, a front subframe pivoted to the main frame and rotatably supporting the front axles in a torsion axle arrangement.

15. The apparatus defined in claim 13, wherein the wheel frame includes a pair of front wheels, front axles, and a front subframe pivoted to the main frame, and further includes a pair of rear wheels, rear axles, and a rear subframe pivoted to the main frame, and still further includes interconnecting braces that connect the front subframes to cause simultaneous swinging movement of the front and rear subframes between an extended position where the wheel frame extends downwardly to contact the front and rear wheels with a ground surface, and a retracted position where the wheel frame is received partially into the main frame in the center area.

16. The apparatus defined in claim 13, including a locking pin attached to one of the main frame and the retractable wheel frame for interlockingly engaging the other of the main frame and the retractable wheel frame for holding the retractable wheel frame in a lowered position for contacting a ground surface.

17. The apparatus defined in claim 13, wherein the wheel frame is pivotally connected to the main frame at a main pivot, and further moves overcenter when moving between a ground contacting lowered position and a retracted raised position.

18. The apparatus defined in claim 13, including an actuator attached between the main frame and the wheel frame for lifting the wheel frame automatically.

19. The apparatus defined in claim 13, wherein the transverse beams each include a first tube attached to the longitudinally-extending beams and a second tube that telescopes in the first tube for providing a laterally adjustable width support on the main frame.

20. The apparatus defined in claim 19, wherein the transverse beams include a third tube telescopingly adjustably engaging in the second tube.

21. The apparatus defined in claim 13, including a retractable hitch attached to the front of the main frame.

22. The apparatus defined in claim 21, wherein the retractable hitch includes an upright beam that is slidably attached to the main frame and further includes a boom attached to a top of the upright beam.

23. An apparatus comprising:
a main frame with opposing sides, a front, a rear, and a center area, the main frame including longitudinally-extending beams on right and left sides of the center area and transverse beams supported by the longitudinally-extending beams, the longitudinally-extending beams and the transverse beams forming an enlarged deck area;
a wheel frame including a pair of front wheels, front axles, and a front subframe pivoted to the main frame, and further including a pair of rear wheels, rear axles, and a rear subframe pivoted to the main frame, and still further including interconnecting braces that connect the front and rear subframes to cause simultaneous swinging movement of the front and rear subframes between an extended position where the wheel frame extends downwardly to contact the front and rear wheels with a ground surface, and a retracted position where the wheel frame is received partially into the main frame in the center area; and
an actuator operably connected to the main frame and the wheel frame for moving the wheel frame between the extended and retracted positions;
a locking pin attached to one of the main frame and the retractable wheel frame for interlockingly engaging the other of the main frame and the retractable wheel frame for holding the retractable wheel frame in a lowered position for contacting a ground surface.

24. The apparatus defined in claim 23, wherein the retractable wheel frame includes a pair of front wheels, a pair of front axles rotatably supporting the front wheels, a front subframe pivoted to the main frame and rotatably supporting the front axles in a torsion axle arrangement.

25. The apparatus defined in claim 23, wherein the wheel frame is pivotally connected to the main frame at a main pivot, and further moves overcenter when moving between a ground contacting lowered position and a retracted raised position.

26. The apparatus defined in claim 23, wherein the actuator is operably attached between the main frame and the wheel frame for lifting the wheel frame automatically.

27. An apparatus comprising:
a main frame with opposing sides, a front, a rear, and a center area, the main frame including longitudinally-extending beams on right and left sides of the center area and transverse beams supported by the longitudinally-extending beams, the longitudinally-extending beams and the transverse beams forming an enlarged deck area;

a wheel frame including a pair of front wheels, front axles, and a front subframe pivoted to the main frame, and further including a pair of rear wheels, rear axles, and a rear subframe pivoted to the main frame, and still further including interconnecting braces that connect the front and rear subframes to cause simultaneous swinging movement of the front and rear subframes between an extended position where the wheel frame extends downwardly to contact the front and rear wheels with a ground surface, and a retracted position where the wheel frame is received partially into the main frame in the center area;

an actuator operably connected to the main frame and the wheel frame for moving the wheel frame between the extended and retracted positions;

an actuator attached between the main frame and the wheel frame for lifting the wheel frame automatically, wherein the transverse beams include a first beam attached to the longitudinally-extending beams and at least one second beam that telescopes laterally for providing an adjustable width support on the main frame.

28. The apparatus defined in claim 27, including at least one pontoon with a front center pontoon and a rear center pontoon that leave an open space in the center area.

29. An apparatus comprising:

a main frame with opposing sides, a front, a rear, and a center area, the main frame including longitudinally-extending beams on right and left sides of the center area and transverse beams supported by the longitudinally-extending beams, the longitudinally-extending beams and the transverse beams forming an enlarged deck area;

a wheel frame including a pair of front wheels, front axles, and a front subframe pivoted to the main frame, and further including a pair of rear wheels, rear axles, and a rear subframe pivoted to the main frame, and still further including interconnecting braces that connect the front and rear subframes to cause simultaneous swinging movement of the front and rear subframes between an extended position where the wheel frame extends downwardly to contact the front and rear wheels with a ground surface, and a retracted position where the wheel frame is received partially into the main frame in the center area;

an actuator operably connected to the main frame and the wheel frame for moving the wheel frame between the extended and retracted positions; and a retractable hitch attached to the front of the main frame.

30. The apparatus defined in claim 29, wherein the retractable hitch includes an upright beam that is slidably attached to the main frame and further includes a boom attached to a top of the upright beam.

31. An apparatus comprising:

a main frame with opposing sides, a front, a rear, and a center area, the main frame including a plurality of beams;

a retractable wheel system including wheels movable between an extended position for contacting a ground surface and a retracted position;

a hitch system including a vertically-extending upright beam with a hitch at a lower end thereof, the upright beam being slidably connected to the main frame and movable between a lowered position where the hitch is positioned at a height for engaging a vehicle's hitch member when the wheels are in the extended position, and a raised position where the hitch is held in safe storage;

an actuator for moving the upright beam between the raised and lowered positions; and a boom attached to a top of the upright beam that is movable by operation of the actuator.

32. The apparatus defined in claim 31, wherein the main frame includes a tube section that slidably engages and supports the upright beam in a vertically-extending orientation.

33. The apparatus defined in claim 31, wherein the boom includes a pivot engaging a top of the upright beam for rotatably supporting the boom.

34. The apparatus defined in claim 31, including an actuator attached between the main frame and the wheel frame for lifting the wheel frame automatically.

* * * * *